United States Patent [19]

Moore et al.

[11] 4,212,717

[45] Jul. 15, 1980

[54] SEPARATION OF ISOTOPES BY PHOTO-INDUCED PREDISSOCIATION

[75] Inventors: C. Bradley Moore; John H. Clark, both of Berkeley; Yehuda Haas, Kensington, all of Calif.; Paul L. Houston, Ithaca, N.Y.

[73] Assignee: The Regents of The University of California, Berkeley, Calif.

[21] Appl. No.: 643,325

[22] Filed: Dec. 22, 1975

[51] Int. Cl.² .............................................. B01J 1/10
[52] U.S. Cl. ....................... 204/158 R; 204/DIG. 11
[58] Field of Search .................... 204/158 R, DIG. 11

[56] References Cited

U.S. PATENT DOCUMENTS 3,983,020  9/1976  Moore et al. ................ 204/DIG. 11

OTHER PUBLICATIONS

Letokhov, Science, vol. 180 (4 May 73), No. 4085, pp. 451, 455 & 456.

Primary Examiner—Howard S. Williams
Attorney, Agent, or Firm—Owen, Wickersham & Erickson

[57] ABSTRACT

Isotopically enriched material can be produced by photopredissociation of gaseous formaldehyde containing mixtures of isotopes of C, H, or O, by laser beams at 32980 cm$^{-1}$ or at 32890 cm$^{-1}$, or by an argon-ion laser beam at 351.1 nm, or by the tripled frequency of a 1.06 $\mu$m neodymium-glass laser beam at approximately 0.35 $\mu$m. At wavelengths shorter than 330 nm a paramagnetic gas, especially NO and also $O_2$ may enhance the enrichment and yield.

13 Claims, 11 Drawing Figures

SEPARATION OF ISOTOPES BY PHOTO-INDUCED PREDISSOCIATION

BACKGROUND OF THE INVENTION

This invention relates to the separation of isotopes by photo-induced predissociation. It covers improvements in the invention by Moore & Yeung described and claimed in U.S. Pat. No. 3,983,020 (Ser. No. 326,833, filed Jan. 26, 1973).

While the principles of the invention and its broad aspects relate quite generally to isotope separation in general and to many different elements, it will be specifically illustrated by the separation of carbon isotopes (especially $^{13}C$ and $^{12}C$) and this will be done using formaldehyde as the starting material.

As explained in the Moore & Yeung patent, the isotopically selective step is the photoexcitation step; all subsequent steps, whether photochemical or photophysical processes, are excitation selective, that is to say, they act only on excited molecules and are not in themselves isotopically selective. The step determinative of which of the possible isotopes is to be separated is the photoexcitation step. Hence, if one wishes to separate out $^{13}C$ from mixtures of formaldehyde showing $^{13}C$ as well as $^{12}C$, he operates within a spectral region where $H_2^{13}CO$ absorption predominates over that of all other isotopes. If he desires to separate out $^{18}O$, he typically tunes his laser to a wavelength where $H_2C^{18}O$ absorption predominates.

A major problem solved by the present invention is in establishing conditions whereby the isotopic selectivity obtained in the photoexcitation step can be carried through the subsequent photochemical and photophysical steps, so that an isotopically enriched product can be obtained. The invention sets forth apparatus and method for determining a suitable wavelength for the separation of any given isotope in a compound. Thus, with formaldehyde, it is possible to enrich any of the possible isotopes present: $^1H$, $^2H$, $^3H$, $^{12}C$, $^{13}C$, $^{14}C$, $^{16}O$, $^{17}O$ and $^{18}O$.

Other problems overcome by the present invention include improving the degree of isotope enrichment by (1) employing particular spectral regions (a) which increase the absorption cross-section of a desired isotope relative to that of another isotope and (b) which also give an increase in the absolute absorption coefficient, (2) eliminating undesirable side reactions, and (3) reducing the expense of operation.

SUMMARY OF THE INVENTION

The invention calls for obtaining the best spectral region or regions for operation by considering (a) the ratio of the absorption cross-section of one isotope relative to another, as it varies with light frequency or wavelength, (b) the overall pattern of absorption coefficients as they vary with light frequency or wavelength, and (c) the laser characteristics as they similarly vary. Apparatus and a method are described enabling improvements in searching for the frequencies to be used for various isotopes in various compounds. For the separation of $^{13}C$ from $^{12}C$ in formaldehyde all of these factors indicate a generally preferred operation near 300 nm. However, at this wavelength there tends to be a scrambling of products due to radicals. The invention, however, includes the discovery that this scrambling can be drastically reduced by introduction of suitable materials which in some way prevent the formation of radicals or else scavenge them after they have been formed. For $^{13}C$ and $^{12}C$ separation and starting with formaldehyde containing both isotopes, we have found that NO gas or $O_2$ gas goes far to eliminate the undesirable side effects.

Thus, in the specific instance of $^{13}C$—$^{12}C$ separation and starting with formaldehyde—an instance which implies broader application of the invention—a general description of the invention is as follows:

A mixture of $H_2^{13}CO:H_2^{12}CO$ is contained by a photolysis cell. A narrowband laser is tuned to a region where $H_2^{12}CO$ absorption predominates over that of $H_2^{13}CO$. The excited $H_2^{12}CO$ predissociates giving $H_2$ and $^{12}CO$. The dissociation products are separated from the starting material by a cryogenic distillation. In some instances, NO is added to increase the separation factor by eliminating unwanted side reactions.

DESCRIPTION OF A PREFERRED EMBODIMENT

1. Selection of wavelength (apparatus used)

Figure 1:
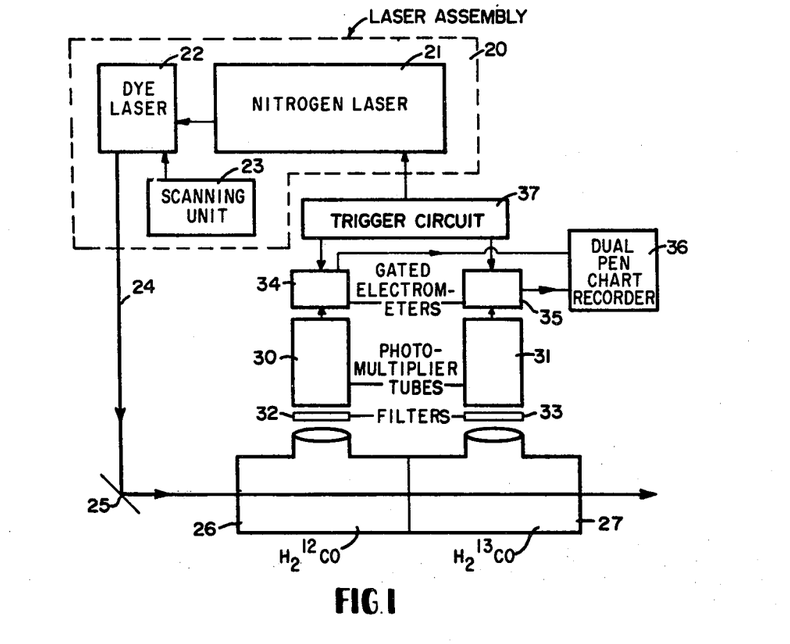
FIG. 1 is a diagrammatic view of apparatus enabling efficient scanning of spectral regions to locate narrow regions where isotope separation may be adequately discriminatory as to the photoexcitation step.

FIG. 1 shows diagrammatically an apparatus which is used to identify appropriate spectral regions in which to carry out isotope separation of various isotopes, such as H, C or O isotopes when using $H_2CO$ as the starting material.

A laser assembly 20 includes a nitrogen laser 21, a dye laser 22, and a scanning unit 23. The nitrogen laser 21 emits powerful (1 MW) pulses of 337.1 nm radiation which are focused into a dye cell in the dye laser 22. The focused nitrogen laser light excites the oscillation of the dye laser 22. The nature of the dye laser 22 is such that its output wavelength is tunable over a broad spectral region (usually more than 10 nm). For example, a particular dye laser 22 may include a diffraction grating and Fabry-Perot etalon to serve as the tuning elements. The tuning elements convert what would be a broad, untuned output into narrow-band, tunable laser light. The scanning unit 23 drives the gating and etalon in such a fashion as to tune the narrow-band output of the dye laser 22 smoothly, without skipping or missing any frequencies, across a broad spectral region. The dye laser light, typically of a frequency in the visible portion of the spectrum, it preferably frequency doubled into the ultraviolet to enable the excitation of the $S_0$ to $S_1$ ultraviolet absorption in $H_2CO$. After frequency doubling, the portion of the visible light still remaining is blocked by an absorbing filter. Thus a beam of narrow-band, tunable, ultraviolet laser light is obtained by using the nitrogen laser 21, dye laser 22, and scanning unit 23 in combination. The devices 21, 22, and 23 are available commercially, for example, from the Molectron Corporation.

Ultraviolet laser light 24 passes out of the dye laser 22 along a desired beam path. For example, the beam 24 may be reflected by a mirror 25 and from there caused to pass, preferably, through two successive absorption cells 26 and 27. This configuration has proved to give a convenient physical arrangement in our laboratory. Other than that, the mirror 25 serves no purpose, and it may be omitted if so desired. Also, the cells 26 and 27 may be arranged differently, e.g., side-by-side, and using a beam-splitter to provide a beam for each cell and, if necessary, means for equalizing the intensities of the two beams, such as a circularly variable neutral density filter.

The absorption cells 26 and 27 are typically set up to contain two different isotopic gaseous mixtures at suitable pressure. In this description, as a specific example, this is illustrated by an arrangement in which the first cell 26 contains $H_2CO$ that is 99% pure in $H_2{}^{12}CO$, while the second cell 27 contains $H_2CO$, 90% pure in $H_2{}^{13}CO$. Similarly, one could load the first cell 26 with $H_2{}^{12}C^{18}O$, and the second cell 27 with $H_2{}^{12}C^{16}O$, or the first cell 26 with $H_2{}^{12}C^{16}O$, and the second cell 27 with $HD^{12}C^{16}O$, or any other combination of the possible isotopic mixtures of $H_2CO$ or other suitable material one cared to study.

As the dye laser 22 is scanned across a spectral region, the $H_2CO$ molecules in the cells 26 and 27 absorb at frequencies appropriate to their characteristic absorption spectra. It is important, when using a sequential arrangement of two cells, that only a small amount of the laser light actually be absorbed by the $H_2CO$ gas during this scanning operation. If a large fraction of the light were absorbed in the first cell 26, the amount of light passing through the second cell 27 would be reduced, and the signal intensity from that cell 27 would be similarly reduced; this would be true even if the same gas were present in both cells 26 and 27. Thus, to make sure that any difference in signal from the two cells 26 and 27 is due only to the difference of the absorption spectra of the two isotopic samples, only a small amount of the laser light can be absorbed in either cell. (Of course, this is a scanning operation not to be confused with efficient use of laser power in actual isotope separation, once the desired frequency has been determined.) Furthermore, before each scan of a spectral region, both cells 26 and 27 are filled with the same gas (e.g., $H_2CO$) at the same pressure (typically 1 torr), and the signals from the two cells 26 and 27 are equalized by adjusting the voltage, and thus the gain of two optical detector means, such as photomultiplier tubes 30 and 31, which observe the fluorescence. Thus all residual intrumental imbalances which might give spurious results are eliminated.

A small percentage of the $H_2CO$ molecules which absorb light reemit the absorbed photon as fluorescence. The fluorescence light is shifted to wavelengths longer than the dye laser light and the photomultiplier tubes 30 and 31, selected to be appropriate for the fluorescence frequency, observe the excited gas in the cells 26 and 27 through respective filters 32 and 33, which absorb the shorter wavelength laser light and transmit the longer wavelength fluorescence light. Thus, the photomultiplier tubes 30 and 31 see only photons due to fluorescence. Hence, the laser light which scatters from various surfaces, even though it is usually more intense than the fluorescence light, is not seen by the photomultipliers 30 and 31.

The photomultiplier tubes 30 and 31 put out a current proportional to the amount of light falling on them. The current from each photomultiplier is amplified and converted to a voltage by one of two gated electrometer circuits 34 and 35. The outputs from the electrometer circuits 34 and 35 are fed to a dual-pen recorder 36. The RC time constant of each electrometer 34, 35 is selected to be a convenient time, preferably, about two seconds, so that the output to the chart recorder 36 represents for example, an average of the signal from about 50 L laser pulses, given a laser pulse rate of 35 pulses per second.

The gating portion of the gated electrometers 34 and 35 helps to improve the sensitivity of the apparatus by reducing the dark current noise from the photomultiplier tubes 30 and 31. Even in the absence of light falling on them, the photomultipliers 30 and 31 put out a small amount of current, termed "dark current". By switching the output of the photomultiplier tubes 30 and 31 to the electrometers 34 and 35 only during the time the fluorescence light is intense, i.e., during and for a short time after the laser pulse, the gating circuit eliminates much of this noise. The gate on each electrometer 34, 35 is typically open for 20 microseconds, 25 times a second, for a total time open of $5 \times 10^{-4}$ seconds per second. Thus, the dark current of the photomultipliers 30 and 31 is effectively reduced by a factor of 2000.

Figure 2:
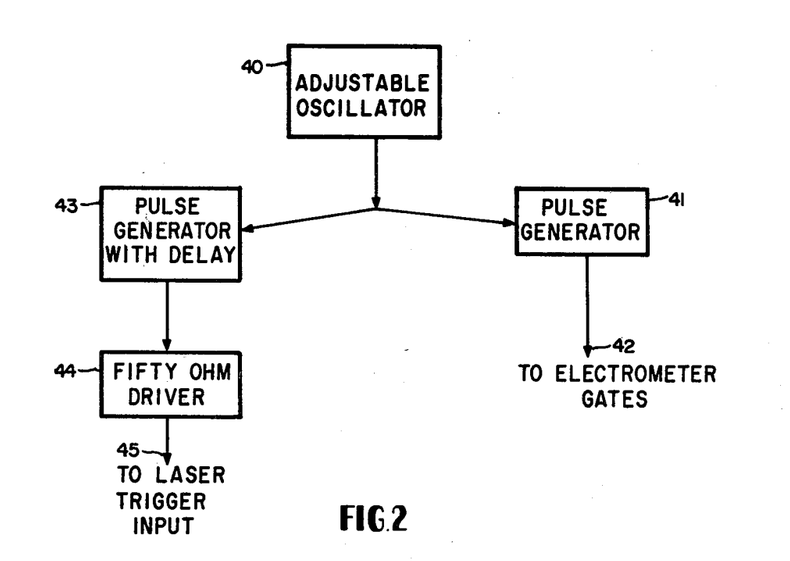
FIG. 2 is a more detailed diagrammatic view of the trigger circuit of FIG. 1.
Figure 3:
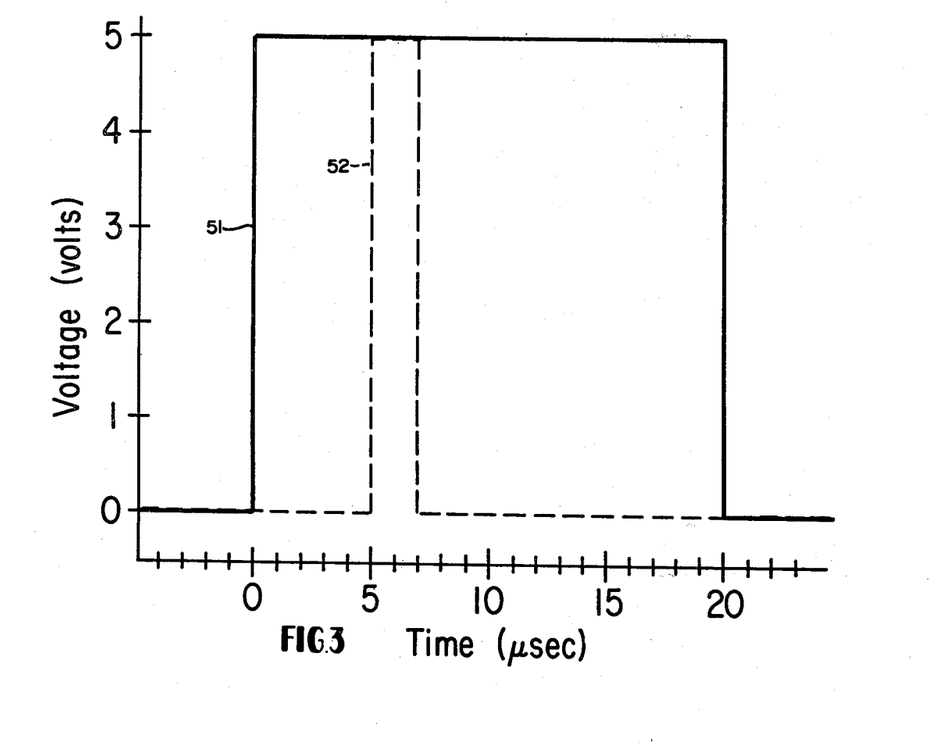
FIG. 3 is a graph illustrating the time delay brought about by the trigger circuit, plotting voltage against time.

A trigger circuit 37 establishes a timing sequence which enables the laser 20 and the gated electrometers 34 and 35 to be synchronized. The trigger circuit 37, a well-known type of circuit, is shown in greater detail in FIGS. 2 and 3. The operation of the trigger circuit 37 is described with reference to these figures, and it works as follows:

1. A typical adjustable oscillator circuit 40 determines the laser repetition rate, and puts out pulses at that rate.
2. The pulse from the adjustable oscillator 40 triggers two pulse generators 41 and 43, known as "one-shots."
3. The pulse generator 41 puts out a 5-volt pulse, shown in FIG. 3 as the solid curve 51. The rising edge of this pulse goes by line 42 to open the gates on the gated electrometers 34 and 35 so that they will now amplify the signal which comes to them from the photomultiplier tubes 30 and 31.
4. The pulse generator 43 also puts out a 5-volt pulse, but its outpulse pulse is delayed 5 microseconds from that of pulse generator 41, substantially coinciding in time with the pulse 52 described below to ensure that the electrometer gates 34 and 35 are fully open before the nitrogen laser 21 fires.
5. The pulse from pulse generator 43 drives a fifty-ohm driver 44. The fifty-ohm driver 44, a well-known type of circuit, ensures that the pulse from the pulse generator 43 has enough current to trigger the nitrogen laser 21.
6. The pulse from the fifty-ohm driver 44 goes to the nitrogen laser trigger input 45 and causes the nitrogen laser 21 to fire. The 5-volt pulse from the fifty-ohm driver is shown in FIG. 3 as the dashed curve 52. FIG. 3 shows how the pulse 52 which triggers the nitrogen laser 21 is delayed 5 microseconds with respect to the pulse 51 which opens the electrometer gates 34 and 35.
7. The width of pulse 52 need only be enough to cause the nitrogen laser to fire. For the particular nitrogen laser employed in our experiments, this pulse width is typically less than or equal to the 2-microsecond width shown for pulse 52 in FIG. 3.
8. The pulse 52 causes the nitrogen laser 21 to fire. The fluorescence from the gas cells 26 and 27 is detected by the photomultipliers 30 and 31, amplified by the gated electrometers 34 and 35, and displayed on the dual-pen chart recorder 36.
9. The gates on the gated electrometers 34 and 35 remain open as long as the pulse 41 stays at the 5-volt level. Thus, in the typical case shown in FIG. 3, the gates are open a total of 20 microseconds, and for 15 microseconds after the nitrogen laser 21 fires. The time the gates are open is chosen so that the gates are open for a time which ensures that virtually all the fluorescence from the gas cells 26 and 27 has been detected by the photomultipliers 30 and 31 and amplified by the gated electrometers 34 and 35. If one worked with a gas whose fluorescence decay was very fast, he would typically shorten the time the gates are open. Similarly, if working with a gas whose fluorescence decayed slowly, one would cause the gates to stay open longer so as to detect and amplify the bulk of the fluorescence.
10. The fall of the pulse 51 from 5 volts closes the gates on the gated electrometers 34 and 35 so that they no longer amplify the signal from the photomultiplier tubes 30 and 31.
11. The cycle is now completed, and repeats again when the adjustable oscillator 40 of the trigger circuit 37 sends out the next pulse. If the adjustable oscillator 40 is set to give a laser repetition rate of 25 pulses per second, this next pulse would occur 40 milliseconds after the previous one.

Using the apparatus just described, searching the spectrum for a suitable spot to separate out a given isotope can become a fairly routine matter.

Figure 4:
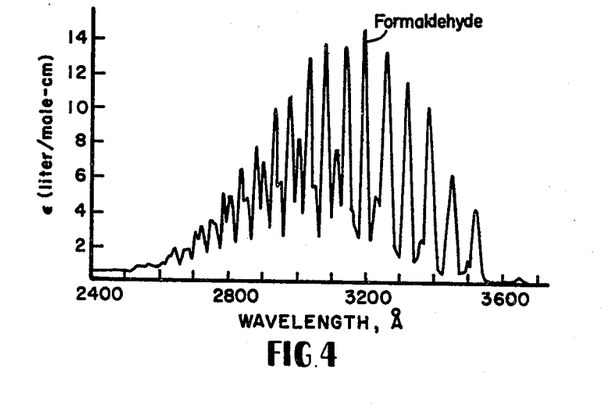
FIG. 4 is a graph plotting the absorption coefficient $\epsilon$ (Epsilon) against wavelength for normal formaldehyde over a wide range of frequencies.

Before using the apparatus of FIG. 1, the general activity of photoexcitation of an isotope to be studied may be scanned over a quite broad range of the spectrum. For example, FIG. 4 shows the low resolution absorption spectrum of normal formaldehyde over the spectrum from 2400 to 3600 Å. Such a diagram indicates an overall envelope that calls attention to the range between about 2900 and 3400 Å as worthy of further study. The data of this curve is obtained by a conventional, commercially available spectrophotometer.

Figure 5:
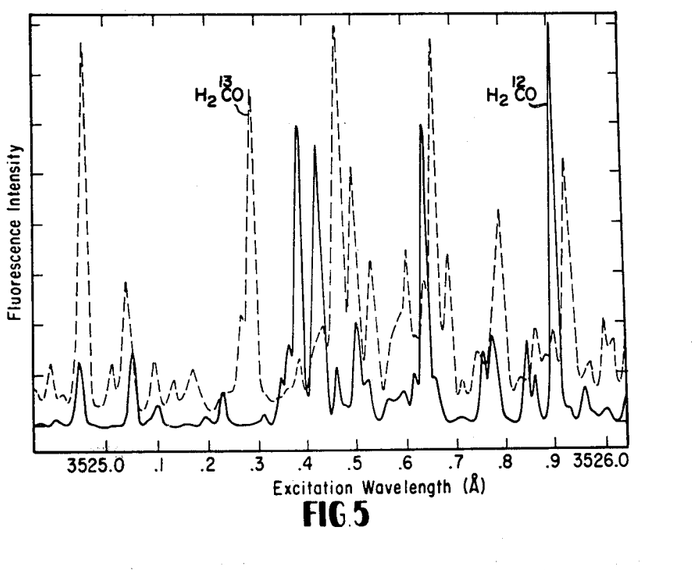
FIG. 5 is a dual-pen chart (intensity of fluorescence in linear scale vs. wavelength) obtained from the apparatus of FIG. 1 in a study of $H_2CO$. The solid line is for $H_2^{12}CO$ and the broken line is for $H_2^{13}CO$.

After narrowing the field to be investigated, the apparatus of FIG. 1 may produce a chart such as that of FIG. 5 where the fluorescence intensity for $H_2^{13}CO$ is shown in broken lines and that of $H_2^{12}CO$ is shown in solid lines on the same chart, just as described. Here the region investigated extends only slightly over 1 angstrom unit. The relative heights of the two curves at various points indicates where results may be most productive.

Selection of the best wavelength involves consideration of the spectroscopy, the photochemistry and laser-technology economics. The following parameters must be considered:

A. Spectroscopic selectivity,
B. Absorption coefficient,
C. Undesired side reactions which arise at various wavelengths, and
D. Laser characteristics (linewidth, power, operating and capital costs).

A. Spectroscopic selectivity

Figure 6:
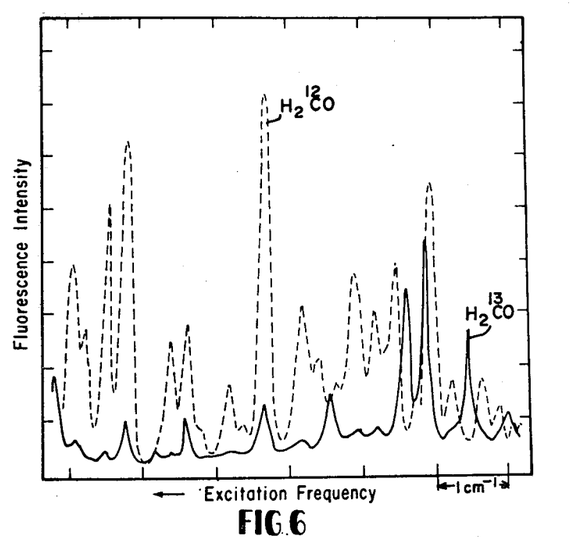
FIG. 6 is a graph showing the fluorescence intensity (linear scale) corresponding to relative excitation frequency in wave numbers for $H_2^{12}CO$ in dashed lines and $H_2^{13}CO$ of 90% isotopic purity (i.e., 10% $H_2^{12}CO$, 90% $H_2^{13}CO$) in solid lines at wavelengths near 303 nm. Here $^{12}C$ generally predominates, especially when the 90% $H_2^{13}CO$ trace is corrected for the 10% contribution from $H_2^{12}CO$.
Figure 7:
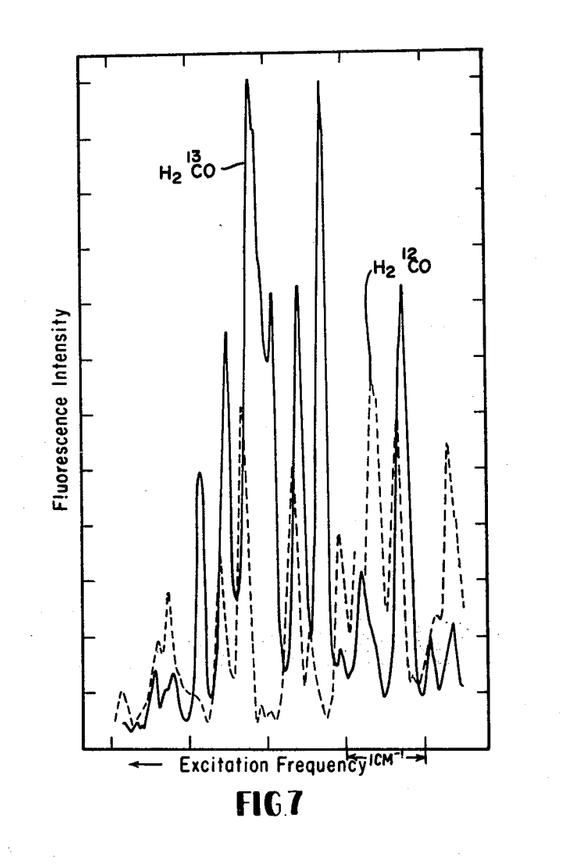
FIG. 7 is a graph similar to FIG. 6 at wavelengths near 304 nm, where $^{13}C$ generally predominates.

The upper limit on the separation factor achievable is set, initially, by the ratio of the absorption cross-section of the desired isotope to that of the undesired one. Using a $N_2$-laser pumped tunable dye laser of 0.1 cm$^{-1}$ resolution, many regions between 300 nm and 355 nm have been identified for which the absorption cross-section of $H_2^{13}CO$ exceeds that of $H_2^{12}CO$ by more than a factor of 100. Such regions are shown in FIGS. 5 and 7. Similarly, in other regions, the $H_2^{12}CO$ absorption cross-section is more than a factor of 100 larger than that of $H_2^{13}CO$. This situation is shown in FIG. 6. These absorption cross-section ratios, while large, appear to be limited by the laser linewidth used in these experiments, not by intrinsic molecular properties.

B. Absorption coefficient

For a fixed gas pressure and cell length, the efficiency of the use of the laser photons is proportional to the magnitude of the absorption coefficient. The value of the absorption coefficient for unresolved rotational structure varies from $5 \times 10^{-4}$ cm$^{-1}$torr$^{-1}$ at 352 nm to $2.4 \times 10^{-3}$ cm$^{-1}$torr$^{-1}$ at 305 nm. Thus, photon utilization efficiency can be increased by operation near 300 nm.

It may also be possible to increase the absorption coefficient by controlling the gas temperature. The peak absorption coefficient is inversely proportional to the linewidth of the absorption. If the predominant factor in determining the linewidth of the absorption is Doppler broadening, then the absorption coefficient will depend on the Doppler linewidth. Since the Doppler linewidth is proportional to the square root of the temperature, the absorption coefficient will increase, as $1/\sqrt{T}$, with decreasing operating temperatures.

The temperature also affects the relative populations of the various vibration, rotation energy levels, the low-lying energy levels tending to have increasing relative population with decreasing temperature. Thus, for excitation from these low-lying energy levels, a decrease in temperature would increase the absorption coefficient. Similarly, for excitation from higher energy levels, which may not be significantly populated at room temperature, increasing the temperature will increase the relative population of these levels, thus increasing the absorption coefficient. One is, however, limited as to the range of temperature available by such things as the vapor pressure of the gas on the low temperature side; or by thermal dissociation or an increasingly complicated absorption spectrum on the high temperature side. Consideration of these effects for the case of formaldehyde indicate that the preferred temperature will probably lie within the range $-100°$ C. to $+100°$ C.

C. Undesired side reactions

Undesired side reactions, which, as stated in U.S. Pat. No. 3,983,020, tend to occur in the pure gas, increase as one goes to shorter wavelength. Thus, the spectroscopic selectivity is best preserved in the subsequent photochemical steps at longer wavelengths. If, however, a way can be found to prevent the formation of radicals, or to scavenge them after they are formed, this constraint on the wavelength is removed.

D. Laser characteristics

Given the present state of the art of dye laser technology, achieving a given power and linewidth near 300 nm is at least one, and probably more than two orders of magnitude less expensive in both operating and capital costs with a tunable dye laser than it would be near 350 nm.

It appears that conditions for separating carbon isotopes economically with a tunable laser are exceptionally good near 300 nm, if the scrambling due to radicals can be eliminated. Near this wavelength, a spectroscopic selectivity of greater than 100 can be obtained.

However, if a wavelength suitable for isotope separation should coincide with the frequency of a fixed-frequency laser, such as a noble gas ion laser or a solid state laser, it may be more economical to use the fixed-frequency laser at a frequency which in a tunable laser would not be so economical.

We have determined that the 351.1 nm argon-ion laser transition is one such fortuitous coincidence. Three small (length 10 cm, diameter 5 cm) absorption cells were placed in the beam of an argon ion laser operating at 351.1 nm. One cell was filled with $H_2{}^{12}CO$, another with $H_2{}^{13}CO$, and the third with HDCO. It was observed that in the cells containing $H_2{}^{13}CO$ and HDCO there was a distinct blue fluorescence, whereas in the cell containing $H_2{}^{12}CO$, no fluorescence could be observed. Thus, the $H_2{}^{13}CO$ and HDCO samples absorb the 351.1 nm light much more strongly than the $H_2{}^{12}CO$ sample. These results are a clear indication that separation of $^{13}C$ or $D(^2H)$ can be carried out utilizing the 351.1 nm argon ion laser. Since this laser is the least expensive and most efficient ultraviolet laser currently commercially available in terms of dollars per watt of average power, it holds promise as the laser source for a commercial isotope separator.

Figure 9:
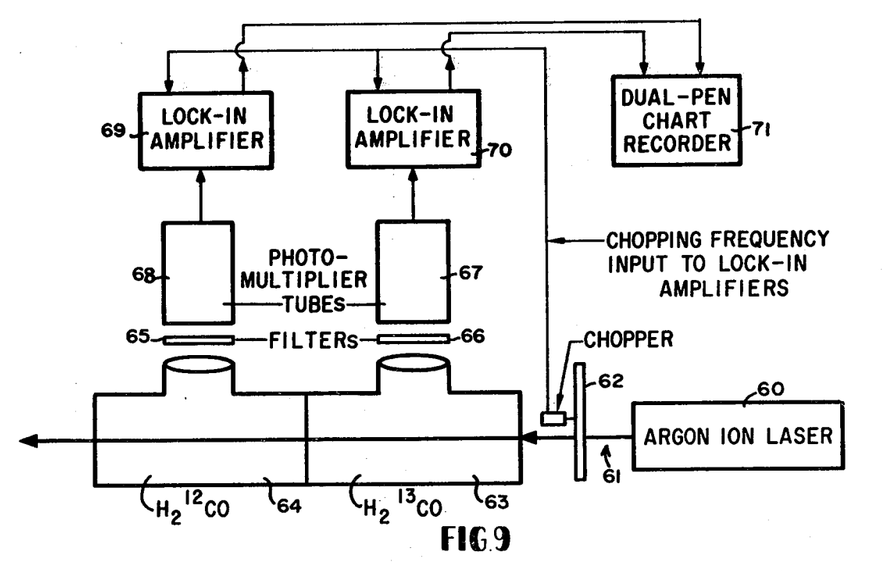
FIG. 9 is a diagram similar to FIG. 1 of a modified apparatus using an argon ion laser.

In order to scan the spectrum to test the relative absorption of two different isotopic species using a continuous wave laser, such as an argon ion laser, a slightly different method from that previously described for a pulsed laser system is used. The apparatus for a measurement of this type is shown in FIG. 9. Due to the possibility of the argon ion laser being a useful laser for an isotope separator, we have used it as a typical example, however the apparatus described is a general purpose instrument and would work similarly for any continuous wave laser, including, if a broad frequency range is to be scanned, a continuous wave dye laser. In fact, it is even suitable for use with incoherent sources, such as an arc lamp passed through a monochromator so as to give a narrow frequency, tunable output.

In this apparatus an argon ion laser 60 emits a laser beam 61 which passes through a chopper 62 and into two cells 63 and 64 containing the gas to be studied, here illustrated as $H_2{}^{13}CO$ and $H_2{}^{12}CO$. Just as in the case of the pulsed laser apparatus of FIG. 1, great care must be taken to ensure the signal from the two cells 63 and 64 are equal when they are each filled with the same gas, so that spurious results do not arise when the cells are filled with two different isotopic species. The laser beam 61 excites the gas molecules in the cells 63 and 64, causing them to fluoresce. The fluorescence is observed by two photomultiplier tubes 67 and 68 through cut-off filters 65 and 66, which serve to block scattered laser light while passing the fluorescence light.

The signal from each of the photomultiplier tubes 67 and 68 is fed into a lock-in amplifier 69 or 70. A lock-in amplifier is an amplifier which only amplifies signals of a given frequency. Thus if the chopper 62 typically chops the laser beam 61 at a frequency of 1000 Hz (cycles per second), and if the lock-in amplifiers 69 and 70 are referenced to this chopping frequency so that they only amplify signals which occur at a frequency of 1000 Hz, then the fluorescence signals from the photomultiplier tubes 67 and 68 will be amplified, while spurious noise, which tends to occur at frequencies other than the chopping frequency, i.e., at random frequencies, is not amplified. Thus the lock-in amplifiers 69 and 70 serve to increase the amplitude of the signal due to the fluorescence, while leaving the amplitude of the noise unchanged, so as to increase the signal-to-noise ratio of the experiment.

The outputs from the lock-in amplifiers 69 and 70 are fed to a dual-pen chart recorder 71 where the fluorescence intensity is displayed. The argon ion laser 60 is tuned over its bandwidth, typically 0.1 to 0.2 cm$^{-1}$, so that the dual-pen chart recorder 71 output becomes a display of the fluorescence intensity versus excitation frequency. Thus any overlap of frequencies suitable for isotope separation with the output frequency of the argon ion laser 60, or any other continuous wave laser, or a continuous incoherent source, can be determined.

The tripled frequency of the 1.06 $\mu$m Nd-glass laser is also worthwhile considering as the light source for a practical isotope separator. Since the tripled output of the Nd-glass laser overlaps a portion of the $H_2CO$ absorption band centered at 352 nm, and since the Nd-glass laser is undergoing rapid technological development, it may prove to be a practical laser source for an isotope separator. The operation of finding good spectral regions in which to operate is substantially as disclosed in FIG. 1, with the Nd-glass laser substituted for the nitrogen laser-dye laser combination.

A final possibility is to tune the molecular absorption into coincidence with the laser, instead of tuning the laser into coincidence with the molecular absorption. Thus, instead of using a tunable laser, one can use a fixed-frequency laser and tune the molecular absorption. This is possible using the Stark effect, whereby spectral lines are split and frequency shifted by the application of an external electric field, or by using the Zeeman effect, whereby spectral lines are split and frequency shifted by the application of an external magnetic field. For more detailed information on the effects of electric and magnetic fields on the formaldehyde spectrum, please refer to the following published articles:

Journal of Molecular Spectroscopy, 48, p.354(1973).
Journal of Chemical Physics, 48, p.4196(1968).
Journal of the Physical Society of Japan, 15, p.2274(1960).
Canadian Journal of Physics, 48, p.1242(1970).
Journal of Chemical Physics, 58, p.3331(1973).
Journal of Molecular Spectroscopy, 56, p.441(1975).
Chemical Physics Letters, 28, p.490(1974).

2. Photochemistry

The photochemical parameters important to the isotope separation are as follows:
A. Photochemical quantum yield,
B. Radical production, especially the elimination of radical scrambling, and
C. Collisional effects on photochemistry, as by energy transfer.

A. Photochemical quantum yield

For formaldehyde, using the disclosed technique, the value of the photochemical quantum yield is nearly unity, that is, each absorbed photon produces one product molecule. This is in contrast to some of the other proposed methods of isotope separation, where the photochemical quantum yield is only $10^{-3}$. The high photochemical quantum yield for this process implies that the physical structure of the separator, the photolysis cell length, the pressure of the gas, and the laser efficiency determine the overall efficiency of the process. Since these parameters are considerably more flexible than the molecular dynamics, the efficiency of this process is limited primarily by the details of the engineering design used in the separator, which is not part of the present invention, rather than by some fundamental photophysical or photochemical limitation.

B. Radical production and elimination of radical scrambling

Experiments have been performed to ascertain to what extent radical production will cause isotopic scrambling and a subsequent decrease in the separation factor. These measurements indicate that for wavelengths longer than 330 nm, radical production will not interfere with a process whose goal is to enrich $^{13}C$ from natural abundance (one percent) to the standard $^{13}C$ purity (ninety percent) of currently available enriched samples. However, for wavelengths shorter than 330 nm, we have found it is necessary to scavenge the radicals produced or to prevent their production by introducing a suitable gas.

We have found that NO eliminates the scrambling due to radical production.

Figure 10:
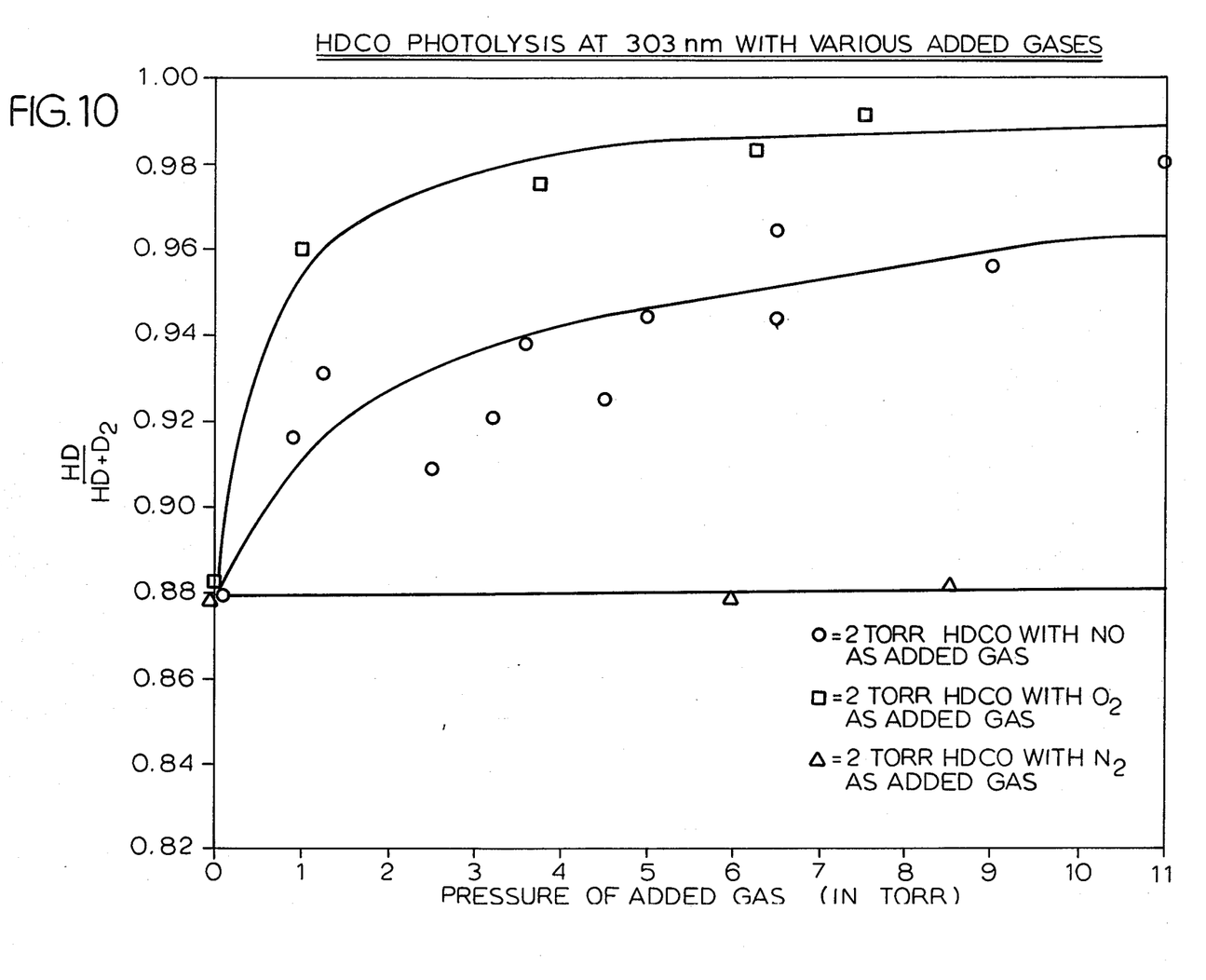
FIG. 10 is a graph plotting percentage of radical products from formaldehyde photolysis against the pressure of added gas in torr, for gas mixtures including, respectively, $N_2$, $O_2$ and NO.

Photolysis at 305 nm with pure formaldehyde at 2.2 torr produced fifty percent radical products. Photolysis of a mixture of 2.2 torr formaldehyde and 5.1 torr NO produced twenty-two percent radical products. Further experiments using various added gases have shown that some effects of $O_2$ are similar to those of NO, while $N_2$ is ineffective in eliminating radicals. Since one common characteristic shared by $O_2$ and NO is their unpaired electrons, i.e., their paramagnetism, it may be that paramagnetism is the critical property and that other paramagnetic gases have this effect also. As shown in FIG. 10, the effectiveness of NO and $O_2$ in removing certain radical products increases as the pressure of the NO or $O_2$ gas is increased.

The mechanism by which NO prevents radical products is not yet clear. The two possibilities are (a) radical scavenging and (b) the elimination of the effectiveness of the reactive channel which leads to radical products. In spite of this mechanistic uncertainty, the results as applied to the isotope separation process are clear: NO prevents radical scrambling. Since the prevention of radical scrambling enables the separation to be carried out in the more easily accessible 300 nm region, the probability of rapid commercial exploitation of this process is greatly enhanced.

FIG. 10 shows the results of a series of tests in which $N_2$, $O_2$ and NO gas at various pressures was added to the formaldehyde gas, the formaldehyde gas being at 2 torr pressure, the laser wavelength being 305 nm. The effectiveness of $N_2$—which did not affect radical production—and the effectiveness of $O_2$ and NO, which drastically decreased the radical production, are shown. For these experiments an $HD/(HD+D_2)$ ratio of 1 means no radicals were produced, while an $HD/(HD+D_2)$ ratio of 0.67 means only radical products were produced.

C. Collisional effects on photochemistry and energy transfer

All of our measurements have been carried out in pressure regimes where collisional effects dominate the photochemistry. Thus, our results are directly applicable to any commercial use of the process, since such use necessitates pressures of approximately 10 torr, or a range of 1–100 torr, in order to achieve the efficiencies which make the process most economically viable.

Since the pressure at which an isotope separator operates can have a substantial effect on the operating cost of the separator, it is worthwhile to consider the properties of formaldehyde which might limit the operation pressure. The first of these is the polymerization of formaldehyde on surfaces, which becomes an increasing problem as the pressure becomes higher. Although the mechanism for the polymerization is not well understood, it is known that the rate of polymerization is affected by the presence of water on the surface and by the temperature of the surface. At room temperature, in a cell heated under vacuum so as to remove much of the water on the surface, a formaldehyde pressure of about 10 torr can be maintained. At 50° C., for a similarly treated cell, it is possible to use a pressure of about 30 torr. With a carefully baked cell heated to 100° C., one can attain a formaldehyde pressure of 100 torr for appreciable times. There is, however, a trade-off between temperature and pressure. One can, in general, increase the working pressure only by increasing the cell temperature. At increased temperature, more and more vibrational and rotational energy levels of the formaldehyde will become populated, thus increasing the density of lines in the absorption spectrum. This will tend to make it more difficult to find regions where the absorption of one isotope predominates over that of another. Also, as pointed out earlier, increasing the operating temperature might tend to decrease the absorption coefficient. Thus, if one wishes to maximize the excitation selectivity in the separator, he would tend to work at reduced temperatures. If he wished to maximize efficiency and throughput, he would typically work at high pressures. An actual separator would tend to be operated in the region between these two extremes, the precise temperature-pressure conditions being dictated by the details of the separator design and the desired product composition.

The second factor influencing the choice of operating pressure is the broadening of spectral lines which tends to occur as one increases the formaldehyde pressure, due to the increased frequency of collisions between molecules. Since the exact value for the pressure broadening coefficient is a function of the specific rotational line excited, it is difficult to predict precisely the effect of pressure broadening on the excitation selectivity. However, the general considerations of the problem suggest that only for gas pressures in the neighborhood of 100 torr or greater will the pressure broadening degrade the excitation selectivity below a factor of 1000. From these arguments, it appears that the primary factor limiting the use of high pressures in the separator will be related to the problem of formaldehyde polymerization.

There is another process, aside from radical production, which might lead to isotopic scrambling, namely energy transfer, wherein the initially excited, isotopically-selected molecule collides with an unselected molecule and transfers its excitation to the unselected molecule. If the unselected molecule then dissociates, loss of isotopic selectivity may result. For separation of $^{13}C$ using formaldehyde as the starting material, the following reaction sequence shows the effects of energy transfer.

$$H_2{}^{13}CO^* + H_2{}^{12}CO \rightarrow H_2{}^{13}CO + H_2{}^{12}CO^*$$

$$H_2{}^{12}CO^* \rightarrow products$$

instead of the desired $$H_2{}^{13}CO^* \rightarrow products$$

Here the * denotes the molecule is in an excited state. There is not yet sufficient experimental data to determine the rate of this energy transfer process, or how the rate might be affected by the addition of some added gas, such as NO or $O_2$. It is certainly possible that part of the improvement in the isotopic enrichment factor observed when NO was used is due to the frustration of energy transfer.

The conditions for maintenance of the spectroscopic selectivity achieved in the excitation step on through the subsequent photochemical steps have been determined. An important and unobvious feature of our invention is the use of NO to both eliminate radical products and to frustrate energy transfer. Thus, the two selectivity-destroying processes are prevented, and experiments demonstrating large enrichments of carbon isotopes have been carried out.

3. A more detailed consideration of specific examples

We have obtained an eighty-fold enrichment of $^{12}CO$ from a 10% mixture of $H_2{}^{12}CO$ in $H_2{}^{13}CO$, with NO as an added gas, using a frequency-doubled dye laser to predissociate formaldehyde selectively.

Formaldehyde is excited to its first singlet state via the vibronically allowed $^1A_1 - ^1A_2$ transition whose origin lies at 28,188 cm$^{-1}$. Subsequent predissociation takes place to either molecular ($H_2 + CO$) or radical ($H + HCO$) products depending on the wavelength of light absorbed. We have studied isotope effects in the absorption spectrum of formaldehyde using a fluorescence excitation technique. Parts of the 300–350 nm region were scanned at high resolution (2–3 GHz) according to the apparatus of FIG. 1, using a commercial dye laser, namely, a Molectron DL-300 pumped by a Molectron UV-1000 and scanned with a Scanning Unit DL-040.

$H_2{}^{12}CO$ (99%, natural abundance) and $H_2{}^{13}CO$ (90% isotopic purity) were placed in separate cells, and their total fluorescence was monitored simultaneously using two photomultiplier tubes and appropriate glass filters. Such studies indicate that sufficient resolution is found near 305 nm to allow spectroscopic selection. We have found that with a laser of 0.1 cm$^{-1}$ resolution a fluorescence excitation selectivity of over 100 may be obtained in the 305 region. It should be noted that, since the relative lifetimes of $H_2{}^{13}CO$ and $H_2{}^{12}CO$ are not known, the actual absorption ratios may differ by a factor of approximately two from the fluorescence excitation ratios.

FIGS. 6 and 7 show fluorescence excitation spectra taken near 303 nm (32980 cm$^{-1}$) and 304 nm (32890 cm$^{-1}$), respectively. The solid line marked as $H_2{}^{13}CO$ actually is taken from a formaldehyde mixture containing 90% $H_2{}^{13}CO$ plus 10% contribution from $H_2{}^{12}CO$, which accounts for the small peaks on the solid line in FIG. 4 underlying the large peaks on the broken line, marked as $H_2{}^{13}CO$. Thus, in FIG. 6 it may be seen that regions of the spectrum exist in which the $H_2{}^2CO$ fluorescence excitation signal is a factor of 10 higher than that from the $H_2{}^{13}CO$. The factor of 10 is the maximum expected ratio in this case, due to the ten percent contribution from the $^{12}C$ formaldehyde present.

Similarly, in FIG. 7, lines are shown for which the $H_2{}^{13}CO$ signal is more than a factor of 50 greater than the $H_2{}^{12}CO$ signal.

Although the 304 nm region of FIG. 7 is expected to produce a higher yield of radical products than regions at longer wavelength, it has two distinct advantages for isotope separation. Firstly, the formaldehyde absorption coefficient is largest in this region ($2.4 \times 10^{-3}$ cm$^{-1}$ torr$^{-1}$, for unresolved rotational structure). Secondly, the highly efficient Rhodamine 6G tunable dye laser may be frequency doubled to operate at 304 nm.

The experimental apparatus for the isotope separation consisted of a flashlamp-pumped dye laser (Chromatix CMX-4) with intracavity doubling and narrowing, two 70 cm long, 3.7 cm diameter photolysis cells, and two fluorescence cells containing one torr samples of $H_2{}^{13}CO$ and $H_2{}^{12}CO$, respectively. The laser beam of $\simeq 0.5$ cm diameter was made to pass through both fluorescence cells. As the laser was tuned to various lines, fluorescence from the two cells was compared in order to determine the spectroscopic separation factor. When a favorable line was found, the two photolysis cells were placed in the path of the beam for a specified length of time. After each run, the residual formaldehyde was frozen into a sidearm using liquid nitrogen and the non-condensible products were analyzed on a mass spectrometer.

Two different mass spectrometers were used. For direct measurements immediately following the photolysis, a low-resolution instrument was employed (AEI MS-10). In these measurements, since the only source of mass 12 and 13 from the non-condensible products is CO, the ratio of these two signals was used to determine the isotopic enrichment. A high-resolution instrument (CEC 21-110) was also used for product analysis. In this case, since the spectrometer allowed separation of background $^{14}N_2$ from $^{12}C^{16}O$, the ratio of the CO 28 and 29 peaks could be taken directly. Control mass spectra were taken on samples treated in an identical fashion but not photolyzed. In all cases, peaks from these background spectra were reproducible and less than 20% of the corresponding peaks from the photolyzed samples.

Figure 8:
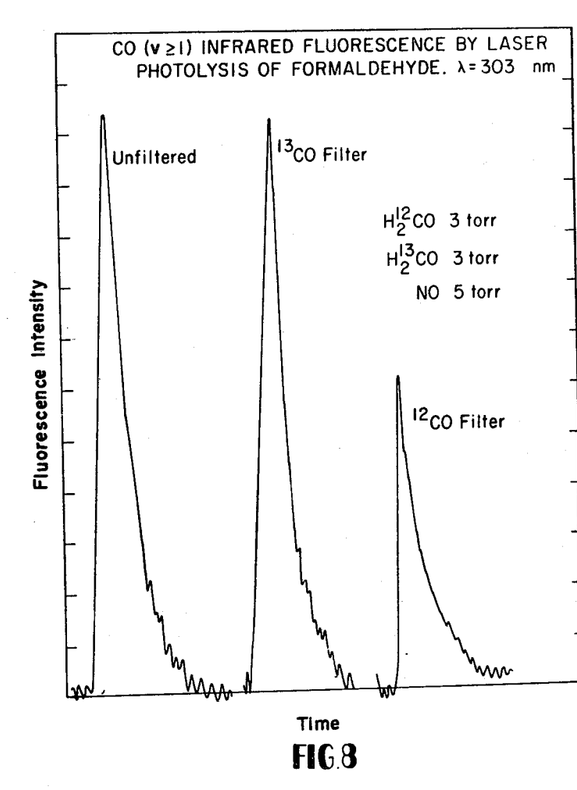
FIG. 8 is a graph plotting fluorescing intensity against time for three separate measurements of carbon monoxide infrared fluorescence resulting from laser excitation of formaldehyde near $\lambda=303$ nm, the formaldehyde being a 50—50 mixture of $H_2^{12}CO$ and $H_2^{13}CO$ at 3 torr each and including also NO at 5 torr (11 torr total pressure). One measurement is made without filtering; the other two measurements are made by passing the CO infrared fluroescence through a gas cell containing, respectively, $^{13}CO$ and $^{12}CO$.

Using an infrared fluorescence technique, we have found that pure $H_2^{12}CO$ produces approximately 10 times more CO than does pure $H_2^{13}CO$ on irradiation at about 303 nm with 5 torr NO, as shown in FIG. 8. In order to test the feasibility of the isotope separation presented here, a 1:1 mixture of $H_2^{12}CO:H_2^{13}CO$ was photolyzed at this wavelength with the unnarrowed laser output (6 cm$^{-1}$ linewidth). Cold gas filters of $^{12}CO$ and $^{13}CO$ were used to determine the production of $^{12}CO$ and $^{13}CO$ from this mixture by comparison with the unfiltered fluorescence intensity. The yield of $^{12}CO$ was found to be approximately twice as large as that of $^{13}CO$. However, when NO was added to the mixture, photolysis at the same wavelength gave double the total yield at an increased selectivity ratio of 10±2.

The exact role of the NO in the dissociation mechanism and in its maintenance of the selectivity is not clear. One possible explanation is that the NO enhances collisionally-induced dissociation, perhaps via intersystem crossings. Another possibility is that it scavenges free radical products.

Mass spectral measurements of the isotope separation are reported in Table 1, the intracavity etalon being used to narrow the ultraviolet linewidth to 0.3 cm$^{-1}$.

TABLE I

MASS SPECTRAL RESULTS OF $^{13}C:^{12}C$ SEPARATION

| Initial Ratio 12/13 | Pressures | | Excitation Ratio 12/13 | Photolysis Time (min) | Final Ratio 12/13* | Enrichment Factor** |
| --- | --- | --- | --- | --- | --- | --- |
| | Total H$_2$CO (torr) | NO (torr) | | | | |
| 1.0 | 4.3 | 0 | >40 | 140 | 6.5 | 6.5 |
| 1.0 | 4.3 | 3.2 | >40 | 140 | 10.5 | 10.5 |
| 0.1 | 2.2 | 0 | >27 | 100 | 1.4 | 14 |
| 0.1 | 2.2 | 2.4 | >27 | 100 | 8.1 | 81 |

\* = ± 20%
\*\* = final isotope ratio/initial isotope ratio

The linewidth and stability of the laser were monitored by observing fringes of the visible output through an etalon (Molectron Model DL30C). The laser was found to fluctuate by roughly as much as its linewidth. Under these conditions, an attempt to enrich the CO product in $^{13}C$ using the line shown in FIG. 7 produced a spectroscopic selectivity of at most two and little or no enrichment. Although the nitrogen-pumped dye laser offered sufficient resolution to select only the $H_2^{13}CO$ lines, its low power (<1 µW) prohibited its use for actual separation. However, flashlamp-pumped laser excitation of $H_2^{12}CO$ lines in FIG. 6 which are well-separated from nearby $H_2^{13}CO$ lines, resulted in an eighty-fold enrichment of the $^{12}CO$ product from a 10% initial mixture. For this result as well as for the other results reported in Table 1, the laser was operated near 303.2 nm with an average power of 0.3 mW.

For the theoretical limit in which every 300 nm laser photon produces one molecule of separated isotope, roughly 0.11 kWh of photons are required to produce one mole of separated product. In any non-ideal separation, the theoretical efficiency will be reduced by the finite efficiencies of (1) the absorptive step and (2) the photochemical step, as well as by (3) the finite separation factor achieved.

In order to determine the efficiencies of the absorptive and photochemical steps, a 1:1 isotopic mixture with added NO was photolyzed by broadband (6 cm$^{-1}$) laser irradiation at 303.5 nm. Mass spectral analysis showed that the CO product was enriched in $^{12}C$ by a factor of approximately ≃3. Enrichment in $^{13}C$ by a factor of approximately ≃1.2 was also observed in the residual formaldehyde mixture. For this separation about 1-2 kWh of photons per mole of product were required.

Theoretical calculations with an absorptive efficiency consistent with the experimental conditions and a photochemical efficiency of unity, consistent with previous measurements, give a power requirement of 1 kWh/mole, in reasonable agreement with the experimental result. The main factor which prevents this experiment from approaching the theoretical limit of 0.11 kWh/mole is the fact that not all of the laser photons are absorbed by the sample. The overall efficiency may thus be improved by operating at higher formaldehyde pressures or increased pathlengths or both. Furthermore, the separation factor as well as the absorptive efficiency may be improved by using a laser with an output confined within a fraction of a linewidth of the optimum absorption frequency. Thus, in the case of formaldehyde, a laser linewidth of less than 0.03 cm$^{-1}$ would be desirable.

We have thus shown that it is possible to construct an apparatus in which most of the laser photons are utilized and for which the separation factor is at least 80. In addition to using this method enriching $^{13}C$ or $^{12}C$, this method can also be used to enrich $^{14}C$, $^{16}O$, $^{17}O$, $^{18}O$, $^{1}H$, $^{2}H$ and $^{3}H$—all from formaldehyde, and, of course, the invention is not limited to formaldehyde or to isotopes actually discussed.

4. The process illustrated in connection with actual isotope separation

The process as described before including laser spectrometers like those of FIGS. 1 and 9, is useful not only in locating regions where the results will indicate success, but also in conjunction with actual isotope separation. The use of the dual-pen chart recorder in conjunction with the apparatus previously described gives a control so that the operator can see that the frequencies have not shifted and that the device is continuing to operate at an appropriate setting.

Figure 11:
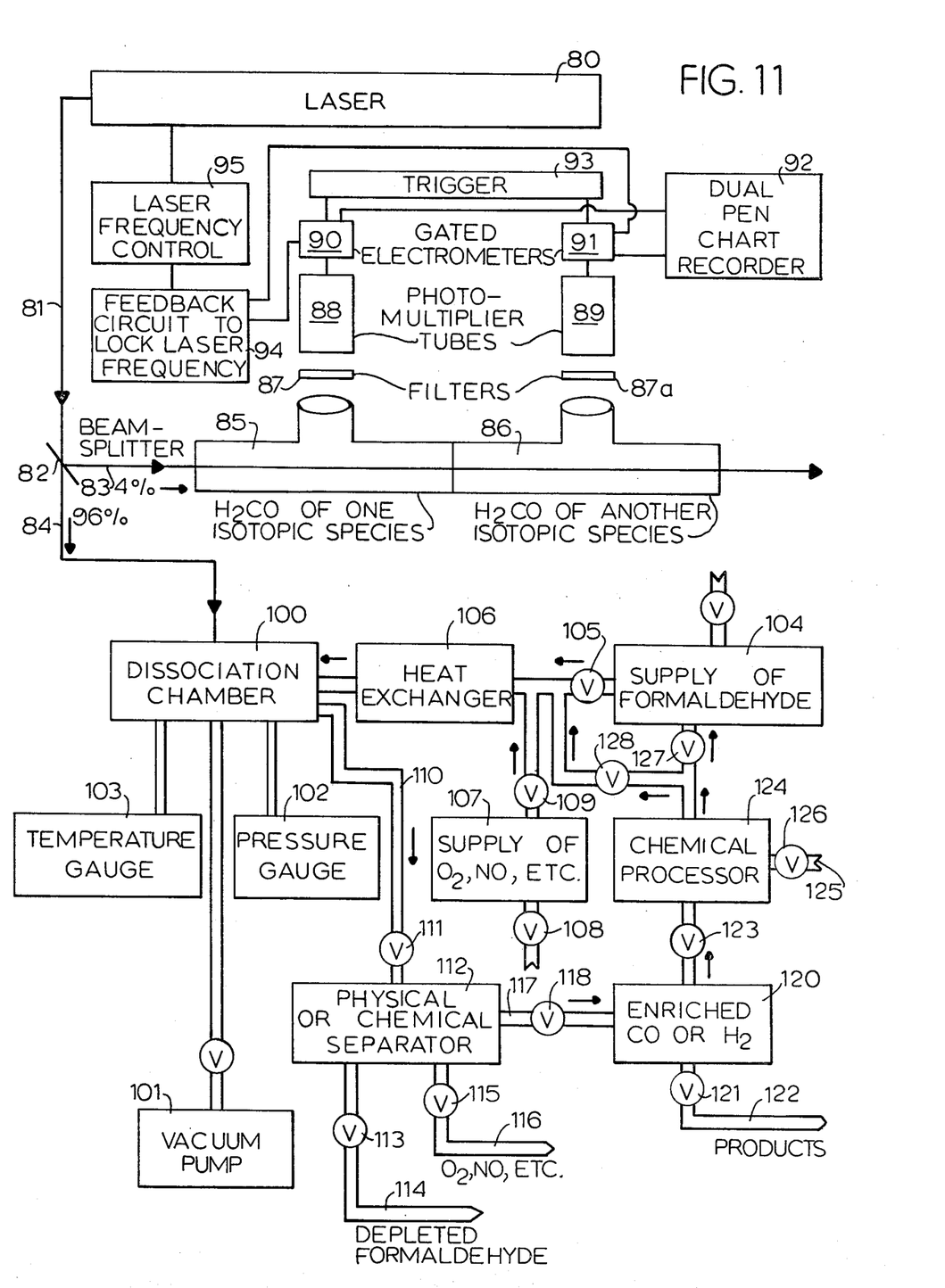
FIG. 11 is a diagram of a typical complete system for isotope separation according to the invention.

FIG. 11 illustrates apparatus and the method as applied to isotope separation. The top portion of the figure is substantially like the equipment of FIG. 1. Here, a laser 80 puts out a beam 81, which in this instance is sent to a beam-splitter 82 and is split into two beams 83 and 84. For example, as illustrated on the drawing, four percent of the energy of the laser beam 81 may be sent as beam 83 to a pair of cells 85 and 86, whereas about 96% of the energy of the laser beam 81 may be sent as the beam 84 to do the actual dissociation work.

The control apparatus includes respective filters 87 and 87a that pass the fluorescence from the cells 85 and 86 respectively to photomultiplier tubes 88 and 89 and from which signals are received respectively by gated electrometers 90 and 91, the outputs from which go to a dual-pen chart recorder 92. Once again, there is a trigger circuit 93 substantially like that of FIG. 2; in this instance, a feedback circuit 94 has been added for the purpose of locking-in the laser frequency to the appropriate isotopic absorption lines. This feedback circuit operates through a suitable laser frequency control 95, similar to the scanning unit of FIG. 1. As stated before, all this portion of the circuit is for control and for holding the laser frequency to the desired frequency to prevent drift, etc.

The main beam 84 goes to a dissociation chamber 100, from which undesired gases are removed by a vacuum pump 101. The pressure in the dissociation chamber 100 is kept between 1 and 100 torr, as indicated by a pressure gauge 102, and the temperature therein is kept between $-100°$ C. and $+100°$ C., as indicated by a temperature gauge 103.

A supply 104 of formaldehyde passes via a valve 105 and a heat exchanger 106 into the dissociation chamber 100. A suitable supply of oxygen or nitric oxide (or other suitable paramagnetic gas) is provided at 107, with input coming in via a valve 108 and output going to the heat exchanger 106 via a valve 109. With everything at the proper temperature and pressure and with the laser beam operating, there will then be a product output via the line 110 through a valve 111 to a suitable separator 112, which may be either a physical separator or a chemical separator. From this separator 112, the depleted formaldehyde is withdrawn through a valve 113 and line 114, and the oxygen, nitrogen oxide, or other suitable paramagnetic gas is withdrawn through a valve 115 or 116. This may be recirculated to the valve 108 or may be used for some other purpose. The isotope-enriched composition leaves the separator via a line 117 and goes through a valve 118, whence it passes into a container 120 of enriched material. From this container 120 a product may be withdrawn through a valve 121 and line 122.

Further enrichment may be obtained by recirculating the material from the container 120. Thus, material may go via a valve 123 to a suitable chemical processor 124, where additional material may be supplied as desired, including anything else desired from a line 125 and a valve 126. From the chemical processor 124, the material may go to the supply 104 of formaldehyde via a valve 127 or may go via a valve 128 directly to the heat exchanger 106.

While formaldehyde has been referred to by way of example, it is, of course, possible to use other chemicals in this connection. All the figures and materials given in this particular example are simply given as examples without any intention of limiting the invention to them. The results of such a process have already been discussed.

We claim:

1. A method for producing isotopically enriched material by photoexcitation of gaseous formaldehyde molecules in which at least one element is present as a plurality of isotopes, those said molecules which contain a first said isotope having a significantly greater tendency to absorb a given spectrum range of light and to be raised to an excited electronic state and to be dissociated thereby, than to those said molecules which contain a second said isotope, comprising the steps of:

submitting said gaseous formaldehyde molecules to light in said given spectrum range and having a wavelength shorter than 330 nm in the presence of a stable paramagnetic gas not reactive with said gaseous formaldehyde molecules, to cause said molecules to be raised to said excited electronic state, thereby dissociating said formaldehyde molecules containing said first isotope, said first isotope entering into a different stable chemical state, physically separating the matter constituting said first isotope in its different chemical state from the remainder of said matter, and said paramagnetic gas enhancing the yield of said first isotope in said different chemical state relative to production of other said isotopes in that said state.

2. A method for producing isotopically enriched material by photoexcitation of gaseous formaldehyde molecules in which at least one element is present as a plurality of isotopes, those said molecules which contain a first said isotope having a significantly greater tendency to absorb a given spectrum range of light and to be raised to an excited electronic state and to be dissociated thereby, than do those said molecules which contain a second said isotope, comprising the steps of:

submitting said gaseous formaldehyde molecules to light in said given spectrum range and having a wavelength shorter than 330 nm, in the presence of gas chosen from the group consisting of NO and $O_2$, to cause said formaldehyde molecules to be raised to said excited electronic state, thereby dissociating said formaldehyde molecules containing said first isotope, said first isotope entering into a different stable chemical state, and physically separating the matter constituting said first isotope in its different chemical state from the remainder of said matter.

3. A method for producing isotopically enriched material by photoexcitation of gaseous formaldehyde molecules in which at least one element is present as a plurality of isotopes, those said molecules which contain a first said isotope having a significantly greater tendency to absorb a given spectrum range of light and to be raised to an excited electronic state and to be dissociated thereby, than do those said molecules which contain a second said isotope, comprising the steps of:

submitting said gaseous formaldehyde molecules to light in said given spectrum range and having a wavelength shorter than 330 nm in the presence of NO gas, to cause said molecules to be raised to said excited electronic state, thereby dissociating said formaldehyde molecules containing said first isotope, said NO gas enhancing both the total yield and the isotopic enrichment, said first isotope entering into a different stable chemical state, and physically separating the matter constituting said first isotope in its different chemical state from the remainder of said matter.

4. A method for producing isotopically enriched material by photoexcitation of gaseous formaldehyde in which at least carbon is present as a plurality of isotopes including $^{12}C$, comprising the steps of:

submitting said formaldehyde to a laser beam at a frequency of approximately 32980 $cm^{-1}$ in the presence of stable paramagnetic gas that does not react with formaldehyde, whereby a significant percentage of said formaldehyde molecules containing said $^{12}C$ is dissociated, the percentage being large relative to that of the molecules of other carbon isotopes which are dissociated, and said $^{12}C$ enters into a different stable chemical state as $^{12}CO$, and physically separating the $^{12}CO$ from said formaldehyde.

5. A method for producing isotopically enriched material by photoexcitation of gaseous formaldehyde in which at least carbon is present as a plurality of isotopes, including $^{13}C$ comprising the steps of:

submitting said formaldehyde to a laser beam at a frequency of approximately 32890 cm$^{-1}$ in the presence of stable paramagnetic gas that does not react with formaldehyde or with carbon oxide, whereby a significant percentage of said formaldehyde molecules containing said $^{13}C$ is dissociated, said percentage being large relative to the percentage of formaldehyde molecules containing only other isotopes which are dissociated, and said $^{13}C$ enters into a different stable chemical state as oxide of $^{13}C$, and physically separating the $^{13}C$ oxide gas from said formaldehyde.

6. A method for producing isotopically enriched material by photoexcitation of gaseous formaldehyde in which at least carbon is present as a plurality of isotopes including $^{12}C$, comprising the steps of:

submitting said formaldehyde to a laser beam at a frequency of approximately 32980 cm$^{-1}$ in the presence of gas chosen from the group consisting of NO and O$_2$, whereby a significant percentage of said formaldehyde molecules containing said $^{12}C$ is dissociated, large relative to that of the other carbon isotopes, and said $^{12}C$ enters into a different stable chemical state as $^{12}CO$, and physically separating the $^{12}CO$ from said formaldehyde.

7. A method for producing isotopically enriched material by photoexcitation of gaseous formaldehyde in which at least carbon is present as a plurality of isotopes, including $^{13}C$, comprising the steps of:

submitting said formaldehyde to a laser beam at a frequency of approximately 32890 cm$^{-1}$ in the presence of gas chosen from the group consisting of NO and O$_2$, whereby a significant percentage of said formaldehyde molecules containing said $^{13}C$ is dissociated and said $^{13}C$ enters into a different stable chemical state as oxide of $^{13}C$, and physically separating the $^{13}C$ oxide gas from said formaldehyde.

8. A method for producing isotopically enriched material by photoexcitation of gaseous formaldehyde in which either the carbon, the hydrogen, or the oxygen is present as a plurality of isotopes, comprising the steps of:

submitting said formaldehyde to an argon-ion laser beam at a wavelength of approximately 351.1 nm, whereby a significant percentage of said formaldehyde molecules containing one isotope of the material having a plurality of said isotopes is dissociated, the percentage being large relative to that of the molecules of other isotopes of the same material which are dissociated, and said one isotope enters into a different stable chemical state, as a substance other than formaldehyde, and physically separating said substance from said formaldehyde.

9. A method for producing isotopically enriched material by photoexcitation of gaseous formaldehyde in which carbon and hydrogen are present as a plurality of isotopes, including $^2H$ and $^{13}C$ comprising the steps of:

submitting said formaldehyde to an argon-ion laser beam at a wavelength of approximately 351.1 nm, whereby a significant percentage of said formaldehyde molecules containing either said $^{13}C$ or $^2H$ is dissociated said percentage being large relative to the percentage of formaldehyde molecules containing only other isotopes which are dissociated, and said $^{13}C$ or $^2H$ enters into a different stable chemical state as a substance other than formaldehyde, and physically separating the said substance from said formaldehyde.

10. A method for producing isotopically enriched material by photoexcitation of gaseous formaldehyde in which carbon and hydrogen are present as a plurality of isotopes, including $^2H$ and $^{13}C$ comprising the steps of:

submitting said formaldehyde to the tripled wavelength of a 1.06 $\mu$m neodymium-glass laser beam at a frequency of approximately 0.35 $\mu$m.

whereby a significant percentage of said formaldehyde molecules containing either said $^{13}C$ or $^2H$ is dissociated, said percentage being large relative to the percentage of formaldehyde molecules containing only other isotopes which are dissociated, and said $^{13}C$ and $^2H$ enters into a different stable chemical state as a substance other than formaldehyde, and physically separating the said substance from said formaldehyde.

11. A method for producing isotopically enriched material by photoexcitation of gaseous formaldehyde in which either the carbon, the hydrogen, or the oxygen is present as a plurality of isotopes, comprising the steps of:

submitting said formaldehyde to the tripled frequency of a 1.06 $\mu$m neodymium-glass laser beam at a wavelength of approximately 0.35 $\mu$m, whereby a significant percentage of said formaldehyde molecules containing one isotope of the material having a plurality of said isotopes is dissociated, the percentage being large relative to that of the molecules of other isotopes of the same material which are dissociated, and said one isotope enters into a different stable chemical state, as a substance other than formaldehyde, and physically separating said substance from said formaldehyde.

12. A method for producing isotopically enriched material by photoexcitation of gaseous formaldehyde in which at least carbon is present as a plurality of isotopes including $^{12}C$, comprising the steps of:

submitting said formaldehyde to a laser beam at a frequency of approximately 32980 cm$^{-1}$, whereby a significant percentage of said formaldehyde molecules containing said $^{12}C$ is dissociated, the percentage being large relative to that of the molecules of other carbon isotopes which are dissociated, and said $^{12}C$ enters into a different stable chemical state as $^{12}CO$, and physically separating the $^{12}$CO from said formaldehyde.

13. A method for producing isotopically enriched material by photoexcitation of gaseous formaldehyde in which at least carbon is present as a plurality of isotopes, including $^{13}$C comprising the steps of:

submitting said formaldehyde to a laser beam at a frequency of approximately 32890 cm$^{-1}$, whereby a significant percentage of said formaldehyde molecules containing said $^{13}$C is dissociated, said percentage being large relative to the percentage of formaldehyde molecules containing only other isotopes which are dissociated, and said $^{13}$C enters into a different stable chemical state as oxide of $^{13}$C, and physically separating the $^{13}$C oxide gas from said formaldehyde.

* * * * *

UNITED STATES PATENT AND TRADEMARK OFFICE
CERTIFICATE OF CORRECTION

PATENT NO. : 4,212,717
DATED : July 15, 1980
INVENTOR(S) : C. Bradley Moore et al.

It is certified that error appears in the above-identified patent and that said Letters Patent are hereby corrected as shown below:

Column 3, line 22, "gating" should read --grating--.
Column 3, line 27, "it preferably" should read --is preferably--.
Column 4, line 46, "50 L laser" should read --50 laser--.
Column 5, line 16, "outpulse pulse" should read --output pulse--.
Column 12, line 41, "$H_2^2CO$" should read --$H_2^{12}CO$--.
Column 13, line 25, "$H_2^{12}CO:H_2^3CO$" should read --$H_2^{12}CO:H_2^{13}CO$--
Column 18, lines 26-27, "tripled wavelength" should read --tripled frequency--.
Column 18, line 28, "frequency" should read --wavelength--.

Signed and Sealed this

Second Day of December 1980

[SEAL]

Attest:

SIDNEY A. DIAMOND

Attesting Officer

Commissioner of Patents and Trademarks